US012701124B2

(12) United States Patent　　　　(10) Patent No.:　US 12,701,124 B2
Boucadair et al.　　　　　　　　　　(45) Date of Patent:　Aug. 4, 2026

(54) METHOD FOR DETECTING A MALICIOUS DEVICE IN A COMMUNICATION NETWORK, CORRESPONDING COMMUNICATION DEVICE AND COMPUTER PROGRAM

(71) Applicant: ORANGE, Issy-les-Moulineaux (FR)

(72) Inventors: Mohamed Boucadair, Châtillon Cedex (FR); Christian Jacquenet, Châtillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 158 days.

(21) Appl. No.: 18/255,447

(22) PCT Filed: Nov. 29, 2021

(86) PCT No.: PCT/FR2021/052128
§ 371 (c)(1),
(2) Date: Jun. 1, 2023

(87) PCT Pub. No.: WO2022/117941
PCT Pub. Date: Jun. 9, 2022

(65) Prior Publication Data
US 2024/0007484 A1　　Jan. 4, 2024

(30) Foreign Application Priority Data
Dec. 1, 2020　(FR) ...................................... 2012481

(51) Int. Cl.
*G06F 15/16*　　　　(2006.01)
*G06F 9/54*　　　　(2006.01)
(Continued)

(52) U.S. Cl.
CPC ...... *H04L 63/1416* (2013.01); *H04L 61/5014* (2022.05); *H04L 63/1466* (2013.01)

(58) Field of Classification Search
CPC ............. H04L 63/1416; H04L 61/5014; H04L 63/1466; H04L 61/4511
(Continued)

(56) References Cited

U.S. PATENT DOCUMENTS 7,523,485 B1 *　4/2009　Kwan ................. H04L 63/1466
　　　　　　　　　　　　　　　　　　　726/2
9,602,531 B1 *　3/2017　Wallace .............. H04L 63/1466
(Continued)

FOREIGN PATENT DOCUMENTS

CN　　　102571806 A　*　7/2012

OTHER PUBLICATIONS

English translation of the Written Opinion of the International Searching Authority dated Mar. 11, 2022 for corresponding International Application No. PCT/FR2021/052128, filed Nov. 29, 2021.
(Continued)

*Primary Examiner* — Hamza N Algibhah
(74) *Attorney, Agent, or Firm* — David D. Brush; Westman, Champlin & Koehler, P.A.

(57)　　　　　　ABSTRACT

A method for detecting a malicious device in a communication network, corresponding communication device and computer program. The method is implemented in a communication device configured with at least one name resolution server which is referred to as a legitimate name resolution server and associated with at least one network interface through which the communication device is able to communicate using at least one first identifier. The method includes: obtaining at least one second identifier, separate from the first identifier, for the communication device and the at least one network interface; obtaining configuration information from a name resolution service for the communication device using the at least one second identifier; and detecting presence of a malicious device in the event of an
(Continued)

Figure 1A:
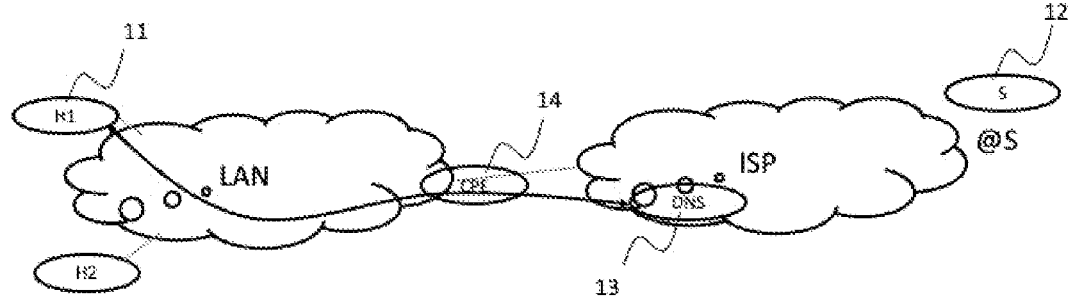

anomaly in the processing of a name resolution request sent by the communication device using the at least one second identifier and the obtained configuration information.

19 Claims, 5 Drawing Sheets

(51) Int. Cl.
| | |
|---|---|
| *H04L 9/40* | (2022.01) |
| *H04L 29/06* | (2006.01) |
| *H04L 61/5014* | (2022.01) |

(58) Field of Classification Search
USPC .......................................................... 726/22
See application file for complete search history.

(56) References Cited

U.S. PATENT DOCUMENTS

| | | | | |
|---|---|---|---|---|
| 9,628,502 | B2 * | 4/2017 | Clark | H04L 63/1416 |
| 10,250,636 | B2 * | 4/2019 | Vissamsetty | H04L 63/1466 |
| 10,652,271 | B2 * | 5/2020 | Osterweil | H04L 63/14 |
| 11,374,835 | B2 * | 6/2022 | Sivaraman | G16Y 40/35 |
| 12,081,518 | B1 * | 9/2024 | Melnick | H04L 63/1466 |
| 12,095,629 | B2 * | 9/2024 | Ogale | G06F 9/45558 |
| 12,273,379 | B2 * | 4/2025 | Shashivasan | G06N 20/00 |
| 2007/0195774 | A1 * | 8/2007 | Sherman | H04L 69/16 |
| | | | | 370/392 |
| 2012/0110144 | A1 * | 5/2012 | Rossi | H04L 61/4511 |
| | | | | 709/220 |
| 2017/0279852 | A1 * | 9/2017 | Drummond | H04L 63/02 |
| 2018/0013788 | A1 * | 1/2018 | Vissamsetty | H04L 63/08 |
| 2018/0027433 | A1 * | 1/2018 | Elliott | H04W 24/04 |
| | | | | 370/216 |
| 2018/0212989 | A1 * | 7/2018 | Mavani | H04L 63/1416 |
| 2019/0349419 | A1 * | 11/2019 | Walsh | H04L 67/141 |
| 2020/0322224 | A1 * | 10/2020 | Sheth | H04W 40/246 |
| 2021/0224183 | A1 * | 7/2021 | Péan | H04L 43/20 |
| 2021/0258279 | A1 * | 8/2021 | Kugler | G06N 20/00 |
| 2021/0314237 | A1 * | 10/2021 | Ogale | H04L 41/28 |
| 2024/0007484 | A1 * | 1/2024 | Boucadair | H04L 63/1466 |

OTHER PUBLICATIONS

International Search Report dated Mar. 11, 2022 for corresponding International Application No. PCT/ FR2021/052128, filed Nov. 29, 2021.

Written Opinion of the International Searching Authority dated Mar. 11, 2022 for corresponding International Application No. PCT/ FR2021/052128, filed Nov. 29, 2021.

Maksutov Artem A et al., "Detection and prevention of DNS spoofing attacks", 2017 Siberian Symposium on Data Science and Engineering (SSDSE), IEEE, Apr. 12, 2017 (Apr. 12, 2017), p. 84-87, XP033226924.

Agarwal Mayank et al., "Discrete event system framework for fault diagnosis with measurement inconsistency: case study of rogue DHCP attack", May 1, 2019 (May 1, 2019), vol. 6, No. 3, p. 789-806, XP011723754.

Droms, R. et al., "Dynamic Host Configuration Protocol", RFC 2131, Mar. 1997.

Alexander, S. et al., "DHCP Options and BOOTP Vendor Extensions", RFC 2132, Mar. 1997.

Mrugalski, T. et al. "Dynamic Host Configuration Protocol for IPV6 (DHCPv6)", RFC 8415, Nov. 2018.

Narten, T. et al., "Neighbor Discovery for IP version 6 (IPv6)", RFC 4861, Sep. 2007.

Hoffman, P. et al., "DNS Terminology", RFC 8499, Jan. 2019.

Hoffman, P. et al., "DNS Queries over HTTPS (DoH)", RFC 8484, Oct. 2018.

Hu, Z. et al., "Specification for DNS over Transport Layer Security (TLS)", RFC 7858, May 2016.

Reddy, T. et al., "DNS over Datagram Transport Layer Security (Dtls)", RFC 8094, Feb. 2017.

Cheng, Y. et al., "TCP Fast Open", RFC7413, Dec. 2014 (Section 4.1).

Watsen, K. et al., "NETCONF Call Home and RESTCONF Call Home", RFC8071, Feb. 2017.

Boucadair, M. et al., "DHCP and Router Advertisement Options for Encrypted DNS Discovery within Home Networks", draft-btw-add-home-10, Nov. 2, 2020.

* cited by examiner

METHOD FOR DETECTING A MALICIOUS DEVICE IN A COMMUNICATION NETWORK, CORRESPONDING COMMUNICATION DEVICE AND COMPUTER PROGRAM

CROSS-REFERENCE TO RELATED APPLICATIONS

This Application is a Section 371 National Stage Application of International Application No. PCT/FR2021/052128, filed Nov. 29, 2021, which is incorporated by reference in its entirety and published as WO 2022/117941 A1 on Jun. 9, 2022, not in English.

1. FIELD OF THE INVENTION

The field of the invention is that of communications within a communication network, for example a computer network implementing the IP protocol. In particular, the invention relates to value-added IP services.

More specifically, the invention relates to name resolution services, for example DNS ("Domain Name System"), and proposes a solution for detecting the presence of a malicious device involved in name resolution.

2. PRIOR ART

The DNS system is a major component in the provision of IP services.

Indeed, a DNS service allows associating a resource (for example of the domain name type, URI (Uniform Resource Identifier, etc.) with one or more IP address(es) to access this resource. For example, the DNS service enables a terminal to obtain the IPv4 and/or IPv6 addresses associated with a domain name.

Different solutions may be considered to provide a DNS service to a terminal.

Examples based on the use of a residential gateway, also called HG, standing for "Home Gateway", or CPE, standing for "Customer Premises Device", are described hereinafter, with reference to FIGS. 1A to 1C.

Recall that such a home gateway conventionally serves as an interface between the local area network ("Local Area Network" (LAN)) of the user and the network of an operator with which the user has subscribed to a service offer ("Internet Service Provider" (ISP)). Hence, this is a device for access to a network of an operator through which all of the characteristic traffic of the different services subscribed to by the user transits, and which also supports a set of services provided locally to the terminals (for example FTP "File Transfer Protocol" service, NFS "Network File System" service, media server, etc.).

During the network connection of a CPE, the operator conventionally provides the CPE with the information necessary to access the connectivity service. Thus, the operator assigns an IPv4 address and/or an IPv6 prefix which may be associated with the CPE to establish IPv4 and/or IPv6 communications from/to the terminals connected to this CPE. The operator also provides the CPE with a list of DNS servers to use for name resolution. To do so, protocols like DHCP for IPv4 (Dynamic Host Configuration Protocol, as described in documents RFC 2131 ("Dynamic Host Configuration Protocol", R. Droms et al., March 1997) and RFC 2132 ("DHCP Options and BOOTP Vendor Extensions", S. Alexander, March 1997), DHCPv6 for IPv6, as described in the document RFC 8415 ("Dynamic Host Configuration Protocol for IPv6 (DHCPv6)", T. Mrugalski et al., November 2018), or ND for IPv6 (Neighbor Discovery Protocol, as described in the document RFC 4861 ("Neighbor Discovery for IP version 6 (IPv6)", T Narten et al., September 2007) may be used between the CPE and the access network. Other mechanisms such as the CWMP ("CPE WAN Management Protocol") protocol may be used for the configuration of the CPE.

Figure 1B:
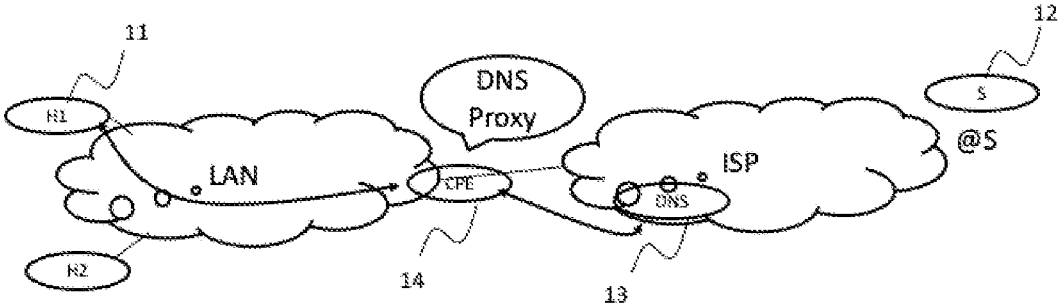
Figure 1C:
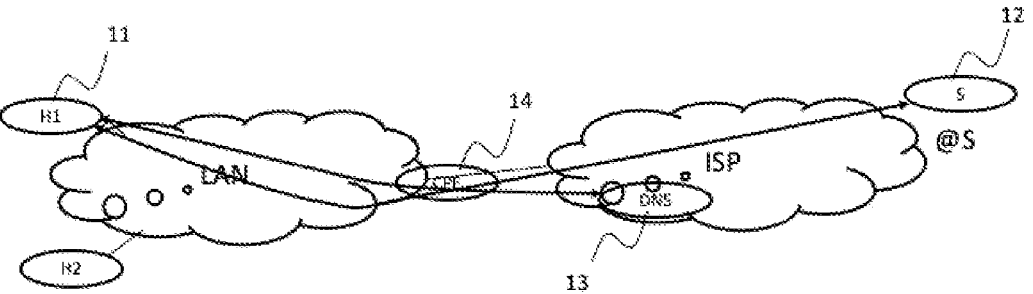

Thus, as illustrated in FIGS. 1A to 1C, a terminal H1 11 (or an application), present in a local area network LAN, wishes to establish communication with a remote server S 12, identified by a domain name (for example FQDN, "Fully Qualified Domain Name"), for example "notreexemple-.com". A DNS client embedded in the terminal H1 11 can send a DNS request, also called DNS resolution request, of the A (if the terminal supports IPv4) and/or AAAA (if the terminal supports IPv6) type to one of the DNS servers 13 provided by the operator and hosted in the access network (for example) to obtain the IP addresses associated with the domain name "notreexemple.com".

Recall that a server reachable in IPv4 can publish an A-type DNS record, whereas a server reachable in IPv6 can publish an AAAA-type record. A server reachable in IPv4 and IPv6 can publish A and AAAA type records. A terminal that wishes to reach such a server should specify the type of the record in the DNS request (A or AAAA). A terminal that supports IPv4 and IPv6 may send two DNS requests: the first request indicates an A-type record and the second indicates an AAAA-type record.

The DNS request may be sent directly from the terminal H1 11 to the DNS server 13, as illustrated in FIG. 1A, or sent to the CPE 14 when it embeds a DNS proxy (also called "forwarder DNS" as defined in the document RFC 8499— "DNS Terminology", P. Hoffman et al., January 2019), as illustrated in FIG. 1B. In the latter case, the CPE 14 may relay the DNS request to the DNS server 13 if no response is found in the local cache.

The DNS server 13 may respond with a list of IP addresses (for example @S) if at least one entry corresponding to the domain name looked for is available in its database for the requested record type (A or AAAA), or relay the request to another DNS server according to the hierarchical structure of the DNS architecture if the DNS server 13 does not have such an entry. In turn, the response received from another DNS server located higher in said hierarchy (authoritative server, for example) is relayed by the DNS server 13 initially solicited to the terminal H1 11.

The DNS response may be sent directly from the DNS server 13 to the terminal H1 11, as illustrated in FIG. 1A, or sent to the CPE 14 in the event of the presence of a "DNS forwarder" as illustrated in FIG. 1B. In the latter case, the "forwarder" of the CPE 14 relays the DNS response to the terminal H1 11.

As illustrated in FIG. 1C, the terminal H1 11 may thus extract the IP address (or addresses) contained in the response (for example @S), then establish communication with the server S 12, by sending a request for connection to one of the returned addresses (for example @S).

A DNS server is called a nominal server if it has been declared, by the operator through the access network, in a communication device, typically when attaching this device to the network, or by means of a prior configuration, for example a "factory" configuration. During this step, the communication device retrieves the accessibility information from one or more (nominal) DNS server(s) provided by the operator(s). An operator may be a provider of connectivity services, voice over IP, etc., and each of these operators could thus provide their own DNS service by hosting one or more DNS server(s) within their infrastructures. The service may be provided through a fixed or mobile infrastructure (for example of the PLMN, "Public Land Mobile Network", type).

Moreover, nowadays, more and more third-party entities offer a public DNS service ("Public Resolvers"). For example, such DNS servers are operated by entities like "Google Public DNS®", "Cloudflare®" or QUAD9®.

More and more clients replace or add to the DNS configuration provided by their operator, that one enabling them to access these public DNS servers.

Thus, a communication device may retrieve a new DNS configuration for each of its active network interfaces (fixed, mobile, WLAN ("Wireless Local Area Network"), etc.). Other information (for example, accessibility of SIP ("Session Initiation Protocol") servers) may also be provided to the communications device.

A drawback of DNS server discovery mechanisms within a LAN network is that they are not secure.

Figure 2:
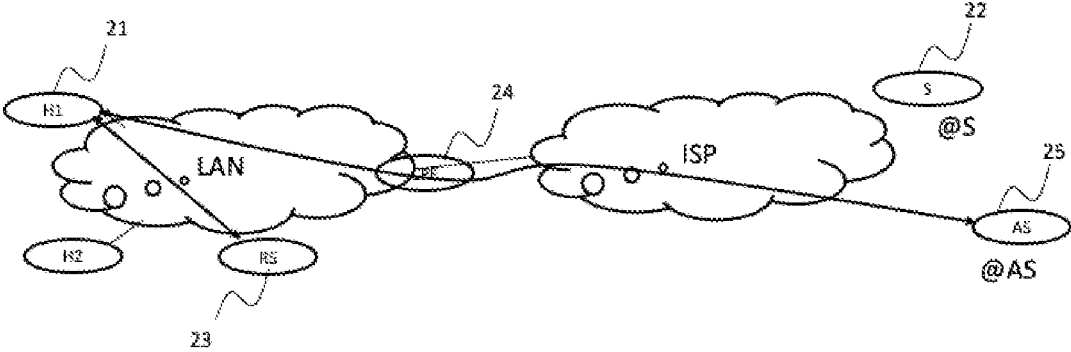

For example, as illustrated in FIG. 2, when the terminal H1 21 connects to the local area network LAN, it could receive messages from a malicious device RS 23 in response to its solicitations for example according to the DHCP or ND protocols. Thus, the terminal H1 21 could receive a message of the router advertisement type RA ("Router Advertisement") originating from the malicious device RS 23, and consider that the malicious device RS 23 is its default router.

The terminal H1 21, which wishes to establish communication with the remote server S 22 identified by a domain name, may then send a DNS request to the malicious device RS 23, instead of sending it to the CPE 24. The malicious device RS 23 may host a fraudulent DNS server and respond with the address of a malicious remote server AS 25 (for example @AS).

Afterwards, the terminal H1 21 may extract the IP address (or addresses) contained in the response (for example @AS), then establish communication with the malicious server AS 25.

Thus, this lack of a secure discovery mechanism within the LAN network could facilitate the execution of attacks that enable the interception of sensitive data of the user (for example personal data) and redirection to fraudulent sites as illustrated in FIG. 2.

A considered first solution is based on the use of authentication certificates.

Nonetheless, such a solution is not sufficient to detect fraudulent devices. Indeed, a fraudulent device could present a valid certificate, obtained from a valid certification authority ("Certification Authority"), which could mislead the devices of the LAN.

In addition, the activation of protocols such as DoH (protocol of the application layer, as described in the document RFC 8484—"DNS Queries over HTTPS (DoH)", P. Hoffman et al., October 2018) or DoT (protocol of the transport layer, as described in the document RFC 7858—"Specification for DNS over Transport Layer Security (TLS)" Z. Hu et al., May 2016) does not allow solving this security problem because the authentication data should also be acquired by the devices of the LAN.

Hence, there is a need for a new solution allowing preserving the security of the communications of the users, while offering value-added services.

3. DISCLOSURE OF THE INVENTION

The invention provides a solution for the detection of a malicious device in a communication network, implemented in a communication device configured with at least one so-called legitimate name resolution server associated with at least one network interface through which said communication device is able to communicate using at least one first identifier.

According to the invention, such a detection method comprises:

obtaining at least one second identifier for said communication device and said at least one network interface, distinct from said at least one first identifier, obtaining configuration information from a name resolution service for said communication device using said at least one second identifier, detecting the presence of a malicious device in the event of an anomaly in the processing of a name resolution request sent by said communication device using said at least one second identifier and the obtained configuration information.

Thus, the invention enables a communication device associated with one or more network interface(s) (for example fixed, mobile, local area network) to pass itself off as another device, for example a terminal which joins the network associated with the first identifier (for example a local area network), in an attempt to detect the presence in said network of malicious devices involved during the name resolution.

Conventionally, the communication device is configured with at least one legitimate name resolution server associated with at least one network interface through which the communication device is able to communicate using at least one first identifier. Next, the network interfaces may be physical and/or logical interfaces (for example "loopback" interface).

This first identifier allows unambiguously identifying the communication device (in particular, the used interface) and may be used by the communication device when it communicates with the terminals of the local area network (for example to transmit the DNS configuration information).

The communication device may also generate, or more generally obtain, at least one second identifier, distinct from the first identifier, but also intended to be used on the same network interface as the first identifier and likely to be used when the communication device behaves like a terminal connected to the same local area network (for example identified by an SSID (Service Set Identifier).

In this way, the communication device emulates a terminal of the local area network, and it is difficult for a fraudulent device to identify that the device that uses said second identifier is the communication device.

For example, said at least one second identifier may comprise:

a MAC address, and/or a link-local address ("link-local"), and/or a unicast IP address, and/or a unique local address (ULA, "Unique Local Address"), and/or an application identifier (token).

Such identifiers may be generated randomly, and therefore in a non-repetitive manner.

In particular, the simultaneous generation and use of several identifiers, which may characterize different layers of the OSI model (link layer, network layer, application layer, for example), has the advantage of making emulation at which the communication device lends itself more difficult to detect and to make the mechanism more robust. These different identifiers are not in conflict with those used by the other terminals of the local area network. This is possible because the communication device has visibility on its own identifiers as well as on those used by the device present in the local area network. It should be noted that the communication device could take charge of managing any possible conflict of the second identifiers if a new terminal connects to the network when the communication device creates a second identifier in conflict with those presented by the new terminal.

Using this second identifier, the communication device may ask for and/or receive information for configuring a name resolution service (which may be part of connectivity information, or not), without the other devices connected to the network knowing that it is the communication device.

In particular, using this configuration information and the second identifier to generate a name resolution request, the communication device may detect the presence of potentially malicious device by analyzing the processing that is done of this request (and possibly of the associated response).

According to a particular embodiment, the configuration information is obtained in a message received by said communication device, said message being a router advertisement message or a message according to the DHCP protocol received in response to a message sent by the communication device using said at least one second identifier, said configuration message of a name resolution service.

According to a first example, the configuration message is a response to a request for configuring a name resolution service or a response to a router solicitation message emitted by the communication device. According to this first example, it is considered that the configuration message is received in response to a solicitation from the communication device. Alternatively, the configuration message may be sent spontaneously by a network device. According to this second example, it is considered that the configuration message is received in a non-solicited way, for example when attaching the communication device to the network using the second identifier.

Thus, as mentioned hereinbefore, the configuration message of a name resolution service may be a response to a request for configuring a name resolution service.

In particular, a request for configuring a name resolution service may be sent in multicast or in unicast.

For example, such a configuration request is broadcast when a new device connects to the network, or when attaching the communication device to the network using the second identifier.

In this way, sending of a request for configuring a name resolution service is not implemented on a regular basis. Thus, it is more difficult for the fraudulent device to detect that the sender of the configuration request is the communication device.

According to a particular embodiment, the request for configuring a name resolution service is transmitted in a DHCP message sent using the second identifier.

The DHCP or DHCPv6 protocols may be used to convey the configuration request(s) of a name resolution service.

As mentioned hereinbefore, the configuration message of a name resolution service may alternatively be obtained in response to a router solicitation message.

Thus, a router solicitation message (or RS, standing for "Router Solicitation") may be sent by the communication device when it emulates a terminal using the at least one second identifier. According to the aforementioned document RFC4861, an RS message requires sending by the concerned routers of a router advertisement message or RA, "Router Advertisement"), the latter possibly including in particular configuration information from a name resolution service. Following sending of such an RS message, the communication device therefore listens to the router advertisement message(s) responding to the RS message sent by the communication device.

According to a particular embodiment, the presence of a malicious device may be detected in the event of usurpation, in a message received by said communication device, of an identity of a default router defined for said at least one network interface.

Such a message may be the configuration message of a resolution service defined hereinabove, or a distinct message. For example, such a message is of the RA type.

In particular, the communication device may be a CPE. In this case, the communication device may be a default router for said communication network, and the detection may implement:

comparing at least one identifier of the sender device of said message received by said communication device with said at least one first identifier of said communication device, if said at least one identifier of the sender device of said received message is identical or correlated to said at least one first identifier of said communication device, the decision according to which said sender device is a malicious device.

For example, the communication device may extract from the received message (configuration message of a resolution service or other message comprising no configuration information) the source address of the sender device of this message, and verify whether it corresponds to one of its addresses (first identifier of the communication device, for example of the global unicast address type or link-local of the CPE). If so is the case, the communication device concludes that the sender device is usurping its identity.

By correlated identifiers, it should be herein, and throughout the rest of the document, understood identifiers related by a dependency relationship (for example an identifier and an encoded version of this identifier). In particular, if the source address is an address that belongs to a prefix of the communication device (for example an IPv6/64 prefix), the latter decides that there is correlation and therefore that the sender device is usurping its identity.

According to another example, the communication device may be a terminal. In this case, the communication device is not a default router defined for said communication network, and the detection may implement:

comparing at least one identifier of the sender device of said message received by said communication device with at least one identifier of a router defined by default, if said at least one identifier of the sender device is not identical or correlated to said at least one identifier of a router defined by default, the decision according to which said sender device is a malicious device.

For example, the communication device may extract from the received message (configuration message of a resolution service or other message including no configuration information) the source address of the sender device of this message, and verify whether it corresponds to one of the addresses of a router defined by default.

Thus, if the received message originates from a device distinct from a router defined by default, the communication device decides that the sender device of the message is a malicious device.

Indeed, the reception of such a message means that the sender device of the response announces itself as a router, while the legitimate router is the router defined by default.

According to a particular embodiment, the detection also implements:

obtaining, from the configuration information, at least one identifier of at least one name resolution server, comparing said at least one identifier obtained with at least one identifier of said at least one legitimate name resolution server, and if said at least one obtained identifier is not identical or correlated to said at least one identifier of said at least one legitimate name resolution server, the decision according to which said sender device is a malicious device.

In this way, it is tested whether another device on the network announces one or more DNS server(s) distinct from the legitimate server(s).

According to a particular embodiment, the method implements, prior to the detection step:

obtaining, from the configuration information, at least one identifier of at least one name resolution server, sending, through the sender device of said configuration information, at least one name resolution request intended for said at least one identified name resolution server.

In the case where the communication device is a CPE (and therefore a default router defined for the communication network), following sending of such a DNS request, the detection step also implements:

if said name resolution request transits after sending thereof by said communication device, verifying the integrity of said request, the decision according to which said sender device of said configuration information is a malicious device if said communication device does not receive said request or if said request is not intact.

In particular, the verification of the integrity of the name resolution request comprises: verifying whether said request transiting through said communication device has been modified compared to the original request and/or has been duplicated.

In the case where the communication device is a CPE or a terminal, following sending of such a DNS request, the detection step further implements:

if a response to said name resolution request is received by the communication device, comparing said response, referred to as test response, with a response to the same request originating from said at least one legitimate name resolution server, referred to as legitimate response, the decision according to which said sender device of said configuration information is a malicious device if said communication device does not receive said test response or if said test response is not identical or correlated to said legitimate response.

According to a particular embodiment, the method implements at least one action following the detection of the presence of a malicious device, said at least one action belonging to the group comprising:

notifying an incident, blocking said malicious device.

In particular, the notification of an incident belongs to the group comprising:

a direct notification of a user of said communication device (for example: automatic call, SMS, etc.), a notification of a user of said communication device through an operator of said network (for example: sending the notification to the operator, which relays the notification to the user using the communication means defined in the subscribed contract), a URL redirection to ask for an explicit authorization of a user of said communication device.

In turn, the traffic blocking may be implemented when the communication device is a CPE, since the traffic transits through it.

For example, the blocking implements a filtering of the messages intended for or received by said malicious device.

Such a blocking may be temporary or permanent. In particular, it may be implemented by filtering the messages intended for or received by the malicious device, by using an identifier of the malicious device, for example its MAC address or by denying access to the local area network to said malicious device if the communication device uses unique session identifiers per terminal (for example, WPA-PSK ("Wi-Fi Protected Access-Pre-Shared Key") with unique keys).

Such a blocking may be implemented by default or conditionally, for example when no identifier of at least one name resolution server is identical or correlated to an identifier of at least one legitimate name resolution server. The conditions for setting up such a blocking may be configured on the communication device (for example immediate set-up of blocking if the DNS server thus discovered appears in a list of unauthorized servers ("discard-list") provided to the communication device).

In another embodiment, the invention relates to a corresponding communication device.

For example, such a communication device is in particular suitable for the implementation of a method for detecting a fraudulent device according to at least one embodiment of the invention. Thus, such a communication device may include the different features relating to the method according to the invention, which may be combined or considered separately.

For example, the communication device is of the gateway (home or corporate, also called "box", HG or CPE), terminal (possibly enabling connection sharing, "tethering"), access key ("dongle"), etc., type.

In another embodiment, the invention relates to one or more computer program(s) including instructions for the implementation of a method for detecting a fraudulent device according to at least one embodiment of the invention, when this or these programs is/are executed by a processor.

Hence, the methods according to the invention may be implemented in various manners, in particular in wired form and/or in software form.

In particular, the method according to the invention may be implemented by a generic module, an application, a DNS resolver ("resolver" or "stub-resolver"), etc. These different modules may be embedded in a communication device as described hereinabove, for example a terminal ("User Equipment"), a dongle equipped for example with a USB port ("(USB) dongle"), a CPE, etc.

4. LIST OF THE FIGURES

Figure 3:
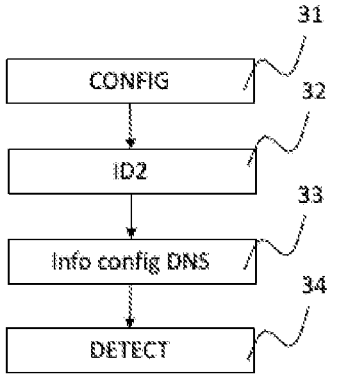
Figure 4:
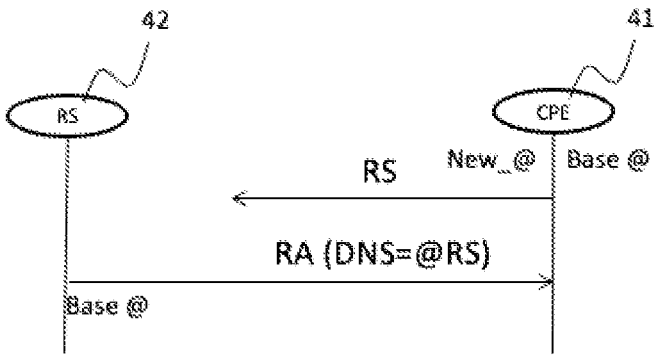
Figure 5:
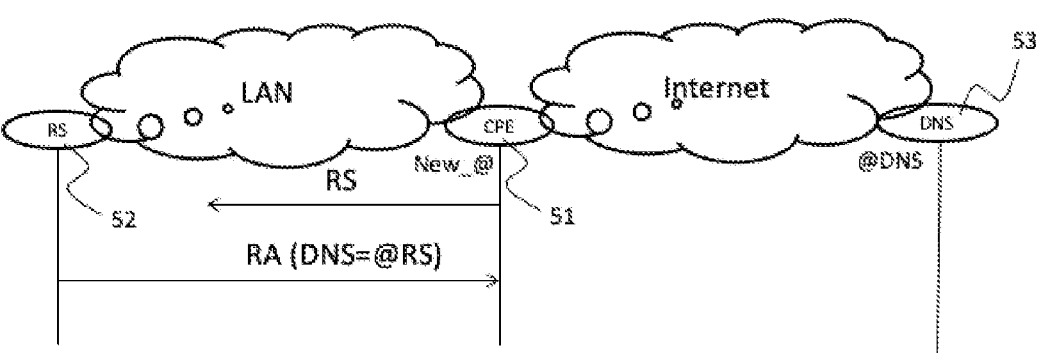
Figure 6:
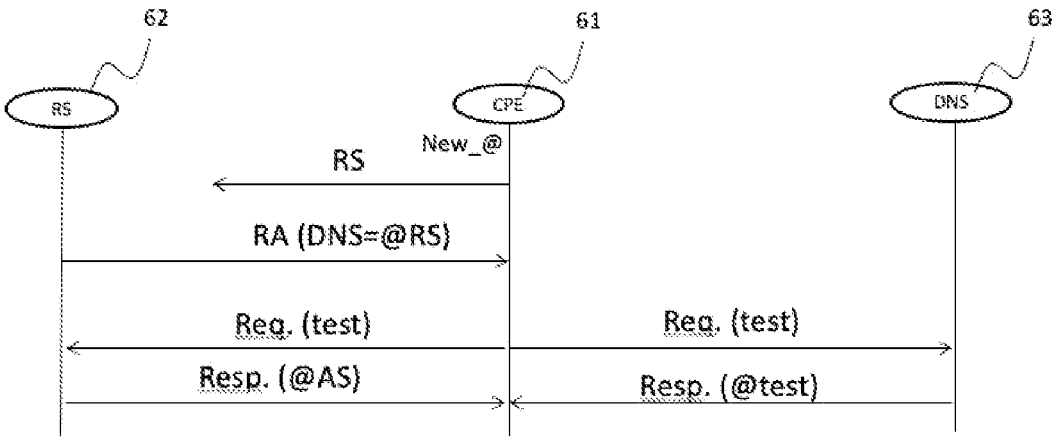
Figure 7:
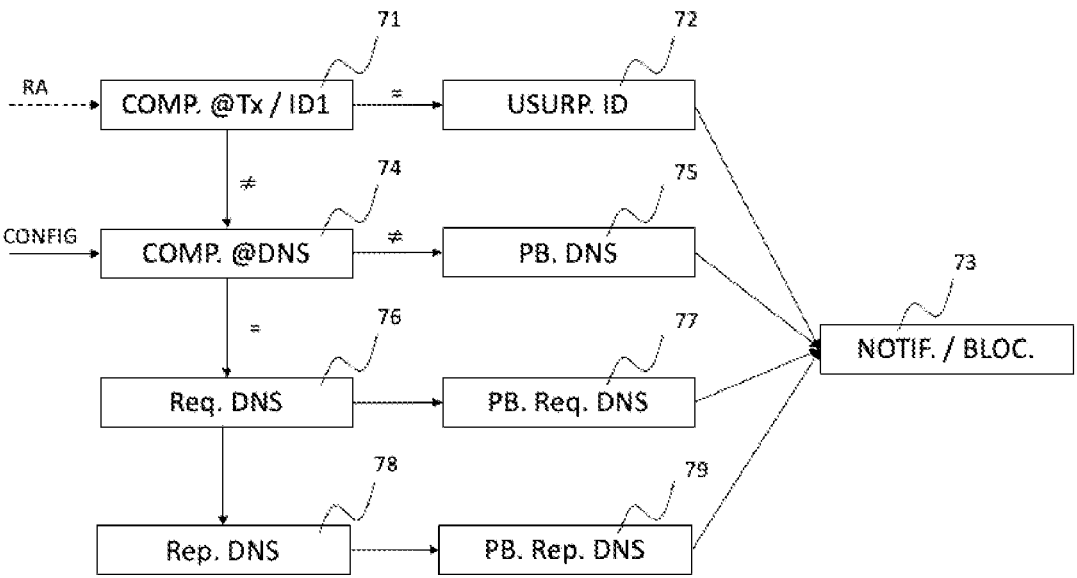
Figure 8:
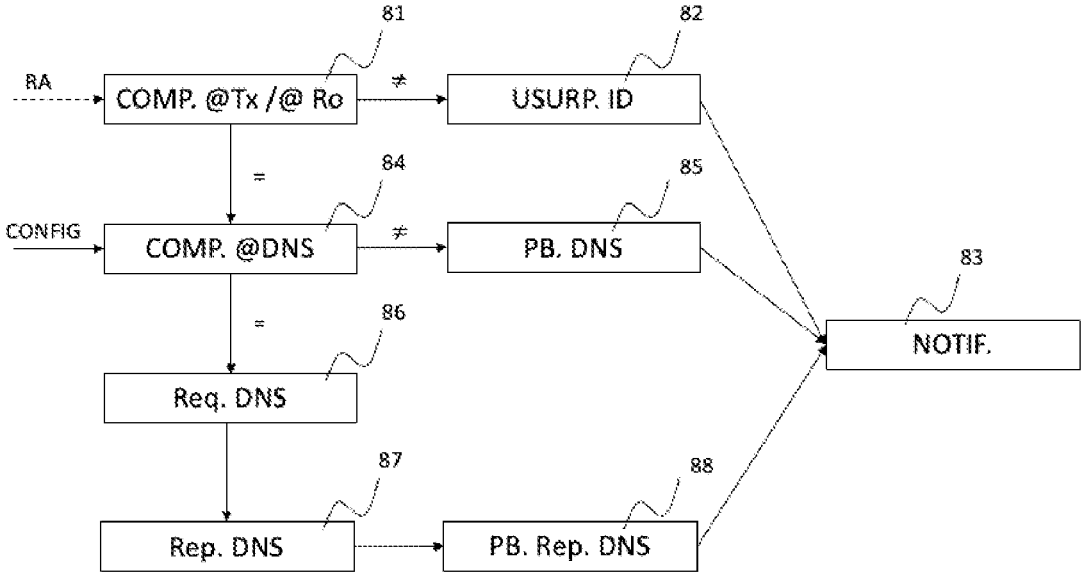
Figure 9:
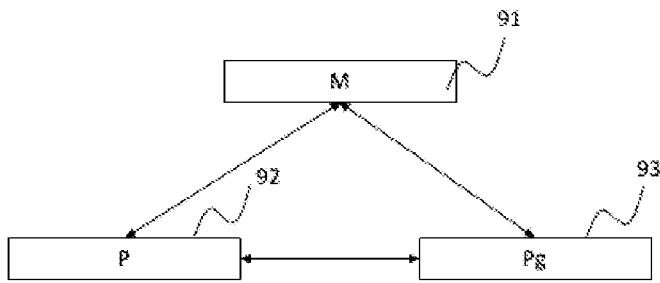

Other features and advantages of the invention will appear more clearly upon reading the following description of a particular embodiment, given as a simple illustrative and non-limiting example, and from the appended drawings, wherein:

FIG. 1A, disclosed in connection with the prior art, illustrates an example of deployment of a DNS service with no DNS relay embedded in the CPE;

FIG. 1B, disclosed in connection with the prior art, illustrates an example of deployment of a DNS service with a DNS relay embedded in the CPE;

FIG. 1C, disclosed in connection with the prior art, illustrates an example of establishment of a connection with a remote server;

FIG. 2, also disclosed in connection with the prior art, illustrates an example of interception of DNS requests by a malicious device;

FIG. 3 discloses the main steps of a method for detecting a malicious device according to at least one embodiment of the invention;

FIG. 4, FIG. 5 and FIG. 6 illustrate examples of messages exchanged between a CPE and a potentially malicious device;

FIG. 7 discloses a flowchart of the different steps that can be implemented by a CPE to detect the presence of a malicious device in a local area network;

FIG. 8 discloses a flowchart of the different steps that can be implemented by a terminal to detect the presence of a malicious device in a local area network;

FIG. 9 discloses the simplified structure of a communication device according to a particular embodiment.

5. DESCRIPTION OF AN EMBODIMENT OF THE INVENTION

5.1 General Principle

The general principle of the invention is based on the use of different identifiers associated with the same communication device, enabling this communication device to emulate the presence of a new device in the network. In particular, such emulation allows detecting the presence of a malicious device in the network, involved during the name resolution.

Referring to FIG. 3, the main steps implemented by a communication device according to the invention are presented.

During a first step 31, which may be implemented prior to the detection method according to the invention, a communication device is conventionally configured with at least one legitimate name resolution server associated with at least one network interface through which the communication device is able to communicate using at least one first identifier.

To do so, according to a first example, the communication device obtains, for each of its available network interfaces, information (domain names, IP addresses, etc.) relating to at least one legitimate name resolution server, provided by the access network associated with these interfaces (for example the network of an operator). For example, such information, called DNS information or DNS configuration, is provided to the communication device using a protocol such as DHCP for IPv4, DHCPv6 for IPv6, a router advertisement message RA, a protocol configuration option PCO ("Protocol Configuration Option"), etc., subject to the use of a dedicated identifier used by the communication device (for example a MAC address or any other equivalent identifier).

According to a second example, such DNS information may be configured locally for each of the available network interfaces associated with the communication device, for example in a declarative manner by an administrator or a user of the communication device. In a particular case, this DNS information may be identical for all active network interfaces of the communication device.

The communication device thus configured may then use at least one first identifier associated with the network interface through which it could communicate with other terminals. For example, this first identifier is a MAC address, an IP address, or an application token ("Token"), and allows identifying the communication device in an unambiguous manner.

During a second step 32, the communication device may obtain (for example generate or receive) at least one second identifier, distinct from the first identifier(s), for the communication device and for the same network interface(s) as the first identifier(s). For example, this second identifier is a MAC address, a link-local IP address, a unicast IP address, a unique local address, an application token, etc. The second identifier thus obtained should also be distinct from those used by the other devices of the local area network (and in particular by the terminals of the local area network).

In particular, this second identifier is used to obtain, during a third step 33, configuration information from a name resolution service.

During a fourth step 34, the configuration information obtained from the second identifier(s) is used to detect the possible presence of a malicious device.

In particular, a malicious device is detected in the event of an anomaly in the processing of a name resolution request sent by said communication device using said at least one second identifier and the obtained configuration information.

The presence of a malicious device may also be detected in the event of usurpation, in a message received by the communication device, of an identity of a default router defined for said at least one network interface. Optionally, such a message may carry said configuration information.

Thus, different information may be used to detect the presence of a malicious device:

the reception of a message in which a network device announces itself as a router, allowing detecting an identity theft, the configuration information (which may be received in this same message or in a distinct configuration message of a name resolution service), allowing analyzing the processing of the DNS requests, in particular if no identity theft is detected.

Thus, the presence of a malicious device can be detected in the event of identity theft or of an anomaly in the processing of a name resolution request transmitted to at least one name resolution server identified in the configuration information.

It should be noted that the disclosed detection method applies independently of the transport protocol used by the name resolution service. In particular, when considering an IP network, the transport protocol used by the DNS communications may indifferently be IPv4 or IPv6 (according to the network access conditions, in particular), and the DNS exchanges may be based on protocols of the application layer (for example HTTPS) or of the transport layer (for example QUIC/UDP)—according to standards such as DoT (RFC 7858 mentioned before), DNS-over-DTLS (RFC 8094 "DNS over Datagram Transport Layer Security (DTLS)", T. Reddy et al., February 2017), DoH (RFC 8484 mentioned before), DNS-over-QUIC (DoQ), etc.

Thus, the proposed solution offers at least one of the following advantages, depending on the considered embodiment:

offering a set of reliable and robust name resolution type services, while minimizing modifications of the existing infrastructures and protocols required to provide such services, detecting attacks and the interception of data within a computer network (home or internal corporate network) by fraudulent devices, which may serve as a relay for such attacks, continuing to offer value-added services, based in particular on name resolution, by an operator to its clients, including the activation of a "forwarder" in a CPE, improving the confidence of the user in the operator with which he has subscribed to such name resolution services.

5.2 Description of a Particular Embodiment

Different examples of implementation of the invention for the detection of fraudulent DNS servers are described hereinafter.

Next, by "legitimate DNS server", it should be understood a name resolution server, whether of the nominal DNS server type (declared or configured by the operator and for example hosted in the access network), a public DNS server, or an "alternative" server. By "alternative servers", it should be understood servers that are not the DNS servers set up and operated by an operator. In general, these alternative servers are not hosted by the IP service provider. Nonetheless, they could operate a public DNS service.

Hence, such a legitimate server may be a server configured by the operator or the user. This server may be a server of the operator or of a third party.

Next, by "malicious device" or "fraudulent device", it should also be understood a machine of the communication network which usurps or announces information allowing intercepting the DNS traffic (for example, a machine usurping the identity of a DNS server or the usurpation of the identity of the default router through which the DNS traffic transits).

It should be noted that no assumption is made as to the nature of the malicious device. For example, this may consist of a device installed by the user, a visitor (for example a guest) device, a device located in the coverage area of the WLAN network, a network access device of the operator (CPE), etc.

For example, the communication network is a home computer network or a corporate network, also called local area network or LAN.

For example, the context of a CPE-type communication device is considered, associated with at least one network interface between the local area network and the access network, and defined as a default router for the terminals of the local area network. Other routers may be deployed in the local area network, for example a home router different from the CPE and installed to segment the traffic of the LAN between the private traffic and the professional traffic. Nonetheless, the traffic between the local area network and the access network transiting through the CPE, the CPE is considered to be a default router.

For example, the network interface is a radio interface (WLAN).

As indicated in connection with step 31 of FIG. 3, the network interface may be configured with DNS information. Such DNS information may be provided to the CPE by the access network (allowing connection to the Internet network), when connecting the CPE to the access network, for example using DHCP, DHCPv6 protocols, or a message AR, PCO, etc. The DNS information may also be configured locally, declaratively, for example through a management interface of the CPE.

The CPE may relay the DNS information to the different devices of the local area network (including the internal routers where necessary), using at least one first identifier associated with the network interface used to this end.

For example, the CPE may announce one or more legitimate DNS server(s) (identified from the DNS information associated with the network interface). These servers may use a transport protocol of the Do53, DoH, DoT, DoQ, etc., type to communicate.

It could be noted that if the CPE embeds a "DNS forwarder" (or DNS proxy), as illustrated in FIG. 1B, the CPE may announce itself in the local area network as being a DNS server, using at least one first identifier.

If the CPE does not embeds any "DNS forwarder", as illustrated in FIG. 1A, the CPE may announce in the local area network the list of legitimate DNS servers, provided to the CPE by the operator through the access network or configured locally, using at least one first identifier.

In both cases, the announcement of the DNS information by the CPE implements, for example, the DHCP protocol for IPv4 or IPv6, or ND between the CPE and the devices of the local area network.

The different network devices may then communicate through the CPE with machines on the local area network or those connected to the Internet, through the network interface, using the first identifier(s). According to a first example, the first identifier(s) comprise(s) a MAC address, for example a MAC address assigned to the network interface that connects the CPE to the local area network and which is a priori static. According to a second example, the first identifier(s) may be an IP address, an application token, etc.

Examples of first identifiers associated with the same local interface are:

a physical MAC address: 4F:E1:9C:6C:CA:67, an IP address: 192.168.1.1, a link-local IPv6 address: fe80:c800:123:123:1.

For example, the address of the DNS server configured for this interface is: 81.253.149.10.

In order to detect whether a malicious device is present in the local area network, the CPE emulates a device of the local area network.

To do so, as indicated in connection with step 32 of FIG. 3, the CPE generates at least one second identifier of the CPE, distinct from the first identifier(s), and intended to be used on the same network interface as the first identifier(s).

According to a first example, the second identifier(s) comprise(s) a MAC address. According to a second example, the second identifier(s) comprise(s) a link-local address ("link-local"), a unicast IP address, an HLA address, or an application token, etc.

Examples of second identifiers associated with the same local interface are:

a physical MAC address: 94:5C:67:AB:14:79, an IP address: 192.168.1.10, a link-local IPv6 address: fe80:6870:9d8e:84fe:798f, a DHCPv6 client application token DUID: 00-01-00-01-25-8E-CB-A1-14-58-DO-B7-01-DC.

In the example hereinabove, the application token may be structured according to a format similar to the DUID ("DHCP Unique Identifier") attribute defined in the aforementioned document RFC8415 (Section 11). According to another example, the application token may be structured according to a format similar to the "Cookie" field defined in the document RFC7413 "TCP Fast Open" Y. Cheng et al., December 2014 (Section 4.1).

In particular, such elements are generated randomly.

For example, a random MAC address may be generated through an instruction like macaddr=$(echo $FQDN|md5sum|sed 's/^\(..\)\(..\)\(..\)\(..\)\(..\)\(..\).*$/02:\1:\2:\3:\4:\5/') if the CPE uses a Linux OS, through external generation tools, etc.

Also, the CPE may obtain the information (identifiers, triggering of the procedure, etc.) to be used during the emulation procedure using a mechanism such as REST-CONF Call Home (as described in particular in the document RFC8071 ("NETCONF Call Home and RESTCONF Call Home", K. Watsen et al., February 2017).

It should be noted that the second identifier(s) should be different from the first identifier(s) used by the CPE to announce the list of the DNS servers or announce itself as a DNS server. In this way, the CPE is not directly identified by the other devices of the local area network as a CPE (in particular if the first identifier is of the static MAC address type). These second identifiers are also different from those used by the terminals already connected to the local area network.

In addition, the generation of the second identifier(s) is preferably implemented randomly over time, or when a new device connects to the local area network.

In this way, a regular and/or recurrent behavior of the CPE, which might be detected by a malicious device, is avoided. Indeed, if a malicious device identifies such a behavior, it could deliberately ignore the requests issued by the device emulated by the CPE.

According to a first embodiment, in order to emulate a terminal connected to the local area network, the CPE may send a request for configuring a DNS service, sent in multicast or unicast in the local area network, and identifying the CPE by means of the or second identifier(s). For example, such a request for configuring a DNS service is sent each time a new device connects to the local area network. Alternatively, this request may be sent only to this terminal. A message for configuring a DNS service may be received by the CPE, as indicated in connection with step 33 of obtaining configuration information of FIG. 3, on an address associated with the second identifier, in response to the request sent by the CPE. It should be noted that different emulation modes may be supported by the CPE, according to the protocols supported in the local area network for example.

According to a first example, the request for configuring a DNS service is transmitted in a DHCP message sent using said second identifier. In this case, the message for configuring a DNS service received by the CPE may be the acknowledgment of receipt of this request.

In an IPv4 context, once the second identifier has been generated by the CPE (for example a MAC address), the CPE may behave like a DHCP client, according to the procedure described in the aforementioned documents RFC 2131 and RFC 2132. Possibly, the CPE may include DNS options and/or new options OPTION_V4_DNS_RI (as defined in the document "DHCP and Router Advertisement Options for Encrypted DNS Discovery within Home Networks, M. Boucadair et al., November 2020) in the "Parameter Request List" option.

In an IPv6 context, once the second identifier has been generated by the CPE (for example from the link-local prefix fe80:/10, different from a first identifier used by the CPE to announce itself as the default router within of the local area network), the CPE may behave like a DHCPv6 client, according to the procedure described in the aforementioned document RFC 8415. Possibly, the CPE may include DNS options and/or new OPTION_V6_DNS_RI options (as defined in "DHCP and Router Advertisement Options for Encrypted DNS Discovery within Home Networks, M. Boucadair et al., November 2020) in the "Option Request Option (ORO)" option.

According to a second example, the request for configuring a DNS service is a router solicitation message RS. In this case, the message for configuring a DNS service received by the CPE may be a router advertisement message RA.

In an IPv6 context, once the second identifier has been generated by the CPE, the CPE may behave like a host (terminal), according to the procedure described in the aforementioned RFC 4861 document. In other words, the CPE may send RS messages and listen to the messages RA.

According to a second embodiment, in order to emulate a terminal of the local area network, the CPE may receive a message for configuring a DNS service as indicated in connection with step 33 of obtaining configuration information in FIG. 3, corresponding to a non-solicited advertisement message, on an address associated with the second identifier. For example, such a message is a router advertisement message RA.

Regardless of the considered embodiment (message for configuring a DNS service received by the CPE of the announcement message type or response to a request for configuring a DNS service), the configuration information and the second identifier(s) are used to send a DNS request and detect, where necessary, the presence of a malicious device in the event of an anomaly in the processing of the DNS request, as indicated in connection with step 34 of FIG. 3.

Moreover, the CPE may receive a message from a device announcing itself as a router. Such a message may be the same as the configuration message of the DNS service (i.e. carrying configuration information), or a distinct message.

In this case, the CPE may in particular detect the presence of a malicious device if the identity of the CPE has been usurped or if it detects an anomaly in the processing of a DNS request transmitted to a DNS server identified from the information configuration through the device announcing itself as a router.

Indeed, the CPE may verify the identity of the sender of the message of the device announcing itself as a router. For example, the CPE extracts from the message the information allowing identifying the sender of the message, like a source MAC address, a source IP address, or any other identifier (for example a token or "Token" disclosed in the message).

The identifier(s) of the sender device are then compared with the first identifier(s) of the CPE.

If there is identity or correlation between at least one identifier of the sender device of the message and at least one first identifier of the CPE, this means that the sender device has usurped the identity of the CPE, and more specifically the first identifier(s) of the CPE. Indeed, it is not the CPE which is at the origin of this message, and therefore the presence of said at least one first identifier in the message as being the source of this message indicates to the CPE that the device at the origin of the message is a malicious device usurping its identity, and more specifically in the example considered herein, the identity of the default router.

Thus, the CPE detects that the sender device of the message is a malicious device, and could initiate an action in response to this detection, for example such as notifying an incident and/or blocking the malicious device.

FIG. 4 illustrates an example of messages exchanged between the CPE 41 and a malicious device 42 in the situation that has just been described. The CPE may communicate with the other devices of the local area network through the network interface. To do so, it has a first IP address, Base@, associated with a first identifier. It also has a second IP address, New_@, associated with a second identifier according to the invention. It should be noted that several IP addresses may be associated with the same interface, and therefore with an identifier. The CPE 41 sends a request for configuring a DNS service in the form of an RS router solicitation message, using its second IP address, New_@ as a source address. In particular, such a router solicitation message RS is received by the malicious device 42, which responds by sending a DNS service configuration message such as a router advertisement message RA, having as a source address the first IP address, Base@. The CPE 41 detects that the source address of the router advertisement message RA corresponds to one of its addresses (Base@), and deduces therefrom that the sender device 42 of the router advertisement message RA is malicious.

Moreover, the CPE may verify, in particular in the case where there is no identity or correlation between at least one identifier of the sender device of the message and at least one first identifier of the CPE, if the sender device of the message does not announce a distinct DNS server from the legitimate DNS server(s).

To do so, the CPE may in particular compare at least one identifier of at least one DNS server obtained from the configuration information, with at least one identifier of the legitimate DNS server(s) announced beforehand by the CPE.

If there is no identity or correlation between at least one identifier of at least one DNS server obtained from the configuration information and at least one identifier of the legitimate DNS server(s) announced beforehand by the CPE, the CPE may decide that the sender device of the configuration information is a malicious device. The CPE could then initiate an action in response to this detection, for example such as notifying an incident and/or blocking the malicious device.

FIG. 5 illustrates the situation that has just been described by an example of messages exchanged between the CPE 51, a malicious device 52, and a legitimate DNS server 53. The CPE may communicate with the other devices of the local area network through the network interface. To do so, it has a first IP address, Base@, corresponding to a first identifier, and a second IP address, New_@, corresponding to a second identifier according to the invention. The CPE 51 sends a request for configuring a DNS service in the form of an RS router solicitation message in the local area network LAN, using its second IP address, New_@ as the source address. In particular, such an RS message is received by the malicious device 52, which responds by sending an RA message specifying a DNS service configuration, identifying a DNS server with the address @RS (which is not that of the legitimate DNS server 53). In this case, the CPE detects that the identifier of the DNS server obtained from the configuration message (@RS) is not identical to the identifier of the legitimate DNS server previously announced by the CPE (@DNS), and that the sender device 52 of the router advertisement message is malicious.

The CPE may also verify, in particular in the case where there is identity or correlation between at least one identifier of at least one DNS server obtained from the configuration message and at least one identifier of the legitimate DNS server(s) announced beforehand by the CPE, if there is no anomaly in the processing of DNS requests.

To do so, the CPE may send one or more DNS request(s) through the sender device of the configuration information of a DNS service, and verify whether it (the CPE) detects an anomaly in the processing of the DNS request(s). By processing a DNS request, it should be herein understood both the way in which one transmits and acts on the request and on the response that could be made to this request.

In particular, if the sender device of the configuration information embeds a "forwarder", then the DNS request(s) is/are sent to this sender device. Otherwise, the DNS request(s) is/are sent to the announced DNS server through this sender device.

Thus, the CPE may check whether it is actually receiving the DNS request(s), since in the example considered herein, it is the legitimate default router.

In particular, the CPE may verify:

whether the DNS requests are relayed by the sender device to a DNS server of the local area network (i.e. the DNS server that the CPE itself hosts if the CPE has a "DNS forwarder", or a DNS server provided by the local area network), and/or whether the DNS requests have been modified during routing thereof, and/or whether the DNS requests have been duplicated towards another server (which could therefore be identified as malicious), and/or whether the DNS request are not relayed, and/or whether the responses to these DNS requests have undergone a fraudulent interception likely to have, for example, call their integrity into question, etc.

If the CPE detects an anomaly in the processing of a DNS request transmitted to at least one DNS server identified in the configuration information, the CPE could initiate an action, for example such as notifying an incident and/or blocking the malicious device.

In any case, the CPE may proceed with additional tests to verify whether its DNS requests are routed to a legitimate DNS server (that one that the CPE hosts itself or a DNS server configured by an operator for example) or another server. In the latter case, the CPE could detect that the sender device is a malicious device.

Thus, the DNS requests intended for the malicious servers can be blocked.

FIG. 6 illustrates an example of the messages exchanged between the CPE 61, a malicious device 62, and a legitimate DNS server 63. The exchanges between the potentially malicious device 62 and the legitimate DNS server 63 are not represented. Like with FIGS. 4 and 5, the CPE 61 sends a request for configuring a DNS service in the form of an RS router solicitation message, using its second IP address, New_@ as the source address. In particular, such a router solicitation message RS is received by the malicious device 62, which responds by sending a DNS service configuration message of the router advertisement message RA type, identifying a DNS server with the address @RS (which is that one of the malicious device 62). The CPE then sends several DNS requests, including a request intended for the legitimate server 63 (known to the CPE) and a request intended for the server identified by the address @RS. The CPE may compare the received responses, and if it detects an inconsistency in the responses (for example the malicious device 62 responds with a first address (@AS), while the legitimate DNS server 63 responds with a second address (@test)), decide that the sender device 62 of the router advertisement message RA is malicious since it manipulates the DNS responses. The remote server identified by the first address @AS is also possibly malicious. The identity of this server may be included in the notification message.

In particular, the above-described different steps may be reiterated by the CPE, preferably on a non-regular basis, for example when a change is detected in the local area network (when a new terminal connects to the local area network, quits the local area network, etc.).

In particular, this repetition allows detecting a fraudulent device that would proceed with the generation of a new identifier, for example a new MAC address, in a recurrent manner.

As indicated before, the CPE can initiate an action, for example such as notifying an incident and/or blocking the malicious device, when it detects a malicious device in the local area network.

In particular, the CPE can quarantine device identified as malicious. For example, two quarantine modes are defined:

default quarantine: in this mode, the traffic originating from or intended for the device identified as malicious is systematically blocked by the CPE. For example, such blocking implements a filtering of the messages intended for or received by the malicious device. In particular, such filtering may be based on an identifier of the malicious device, for example its MAC address.

conditional quarantine: in this mode, the traffic originating from or intended for the device identified as malicious is blocked only if DNS server identifiers different from the identifiers of DNS servers known to the CPE (configured beforehand, either declaratively, or when connecting the CPE to the access network) are announced. This mode covers the case where identical SSID-type identifiers are used by a home router different from the CPE and installed for example to segment the traffic of the LAN between the private traffic and the professional traffic.

Such filtering may be temporary, for example for a duration set in the management interface of the CPE, or permanent. It may also be reviewed following the processing of one or more incident notification(s).

Indeed, the CPE may also (alternatively or complementarily) send notifications allowing signaling an incident. For example, three notification modes are defined:

notification through the operator: according to this mode, the CPE sends a notification of an incident to a server of the operator. Afterwards, this notification may be relayed to the client (user of the CPE, administrator of the local area network), for example by using the communication means defined under the contract subscribed by the client (SMS messages, telephone call, email, etc.);

direct notification: according to this mode, the CPE sends a notification directly to the client (SMS message, automatic call from the CPE to a number of the client, display on the front screen of the CPE, etc.);

HTTP redirection: according to this mode, the CPE sends a notification to the client (directly or through the operator) to ask for authorization to redirect the traffic. The redirection is performed, for example, the first time an anomaly has been detected. For example, the traffic generated by the malicious device may be redirected to a portal of the operator accessible in HTTP, and whose URL is contained in the notification sent to the client. Thus, the traffic redirected by the CPE to the portal of the operator could allow signaling the fraudulent behavior, and protecting the client from any fraudulent use of his personal information, as it might be manipulated by a malicious DNS server.

In particular, the quarantine may be confirmed following sending of the notifications, for example if the client receives a notification and confirms the fraudulent nature of the incident.

Thus, the blocking policy may be updated following the processing of an incident notification.

As a summary, FIG. 7 shows a flowchart of the different steps that can be implemented by a CPE to detect the presence of a malicious device in the local area network associated with the CPE:

if the CPE receives a message announcing a router (RA), the CPE could compare the source address of the sender of this message with its first identifier(s) (71);

if there is identity, the CPE concludes that his identity is being usurped (72), and could initiate an action (73), for example such as notifying an incident and/or blocking the malicious device, if there is no identity, the CPE carries on the analysis;

the CPE obtains configuration information (for example in a DNS configuration message or in the message announcing a router), and compares the identifier of at least one DNS server obtained from the configuration information, with the identifier of at least one legitimate server (74);

if there is no identity, the CPE concludes that another entity announces itself as a DNS server (75), and could initiate an action (73), for example such as notifying an incident and/or blocking the malicious device, if there is identity, the CPE carries on the analysis;

the CPE sends at least one DNS request (76) through the sender of the configuration information;

if it detects an anomaly in a DNS request (77) (for example the DNS request does not transit through the CPE, the DNS request transiting through the CPE is modified compared to the sent DNS request, the DNS request is duplicated, etc.), the CPE could initiate an action (73), for example such as notifying an incident and/or blocking the malicious device;

if it does not detect an anomaly, the CPE carries on the analysis;

the CPE waits for a response to the DNS request (78);

if it detects an anomaly in the response (79) (for example no response received, or received response different from a response received directly from a legitimate DNS server), the CPE could initiate an action (73), for example such as notifying an incident and/or blocking the malicious device;

if it does not detect an anomaly, the CPE could conclude that it has not detected any malicious device in the local area network.

An exemplary implementation has been described hereinabove according to which the communication device is a CPE, associated with at least one network interface between the local area network and the Internet network.

Of course, this is a simple example, and the communication device may be a terminal of the local area network, a dongle, etc., possibly allowing connection sharing for access the local area network, configured by a user with the identity of his default router as well as a list of trusted DNS servers. In particular, in the case where such a device does not establish connection sharing and does not behave like a network access device, the above-described procedure is the same with the exception of the quarantine which is not implemented (since the traffic does not transit through this device).

For example, FIG. 8 shows a flowchart of the different steps that can be implemented by a terminal to detect the presence of a malicious device in the local area network to which this terminal belongs. It is assumed that this terminal has been configured beforehand with a list of legitimate DNS servers (for example a list of IP addresses, domain names, authentication credentials) and trusted (default routers within the meaning of the invention) routers (for example a list of IP addresses, DUID of the DHCP server embedded in a router):

if the terminal receives a message announcing a router for the devices of the network (for example an RA message), the terminal could compare the source address of the sender of this message with the address of the trusted default router (81);

if there is no identity, the terminal concludes that a device is usurping the identity of the default router (82), and could initiate an action (83), for example such as notifying an incident, if there is identity, the terminal carries on the analysis; the terminal obtains configuration information (for example in a DNS configuration message or in the message announcing a router), and compares the identifier of at least one DNS server obtained from the configuration information, with the identifier of at least one legitimate server with which it has been configured beforehand (84);

if there is no identity, the terminal concludes that another entity announces itself as a DNS server (85), and could initiate an action (83), for example such as notifying an incident, if there is identity, the terminal carries on the analysis; the terminal sends at least one DNS request (86) through the sender device of the configuration information;

the terminal waits for a response to the DNS request (87);

if it detects an anomaly in the response (88) (for example no response received, or received response different from a response received from a legitimate DNS server), the terminal could initiate an action (73), for example such as notifying an incident;

if it does not detect an anomaly, the terminal could conclude that it has not detected any malicious device in the local area network.

Moreover, it should be noted that the above-described procedure may be activated/deactivated by the user of the communication device. In particular, the activation or deactivation request mechanism may be executed during the set-up of the CPE, during a connection to the management interface of the CPE, through a notification sent by the operator, etc.

5.3 Simplified Structure of the Communication Device

Finally, referring to FIG. 9, the simplified structure of a communication device implementing a method for detecting a malicious device according to an embodiment described hereinabove is disclosed.

As illustrated in FIG. 9, such a device comprises a memory 91, comprising for example a buffer memory, a processing unit 92, equipped for example with a processor P, and controlled by the computer program Pg 93, implementing the method for detecting a malicious device according to an embodiment described hereinabove.

Upon initialization, the code instructions of the computer program 93 are for example loaded into a RAM memory before being executed by the processor of the processing unit 92. The processor of the processing unit 92 implements the steps of the method for detecting a malicious device according to an embodiment described hereinabove, according to the instructions of the computer program 93, to:

obtain at least one second identifier for said communication device and said at least one network interface, distinct from said at least one first identifier, obtain configuration information from a name resolution service for said communication device using said at least one second identifier, detect the presence of a malicious device in the event of an anomaly in the processing of a name resolution request sent by said communication device using said at least one second identifier and the obtained configuration information. In a particular embodiment, the presence of a malicious device may also be detected in the event of identity theft.

The invention claimed is:

1. A method comprising:

detecting a malicious device in a communication network, the detecting being implemented in a communication device configured with at least one legitimate name resolution server associated with at least one network interface, wherein the detecting comprises:

communicating through the at least one network interface using at least one first identifier for said communication device, generating by the communication device at least one second identifier for said communication device and said at least one network interface, distinct from said at least one first identifier, emulating a terminal of the communication network distinct from the communication device, and communicating through said at least one network interface using said at least one second identifier, the emulating comprising obtaining configuration information from a name resolution service for the emulated terminal using said at least one second identifier instead of said at least one first identifier, and said at least one network interface, and detecting presence of a malicious device in the event of an anomaly in processing of a name resolution request sent by the emulated terminal using said at least one second identifier instead of said at least one first identifier, and the obtained configuration information.

2. The method according to claim 1, wherein said configuration information is obtained in a message received by said communication device, said message being a router advertisement message or a message according to the Dynamic Host Configuration Protocol (DHCP protocol) in response to a message sent by the communication device using said at least one second identifier, said name resolution service configuration message.

3. The method according to claim 1, further comprising detecting the presence of a malicious device in the event of usurpation, in a message received by said communication device, of an identity of a default router defined for said at least one network interface.

4. The method according to claim 3, wherein said communication device is the default router for said communication network, and said detecting implements:

comparing at least one identifier of a sender device of said message received by said communication device with said at least one first identifier of said communication device, if said at least one identifier of the sender device of said received message is identical or correlated to said at least one first identifier of said communication device, deciding said sender device of said received message is a malicious device.

5. The method according to claim 3, wherein said communication device is not the default router defined for said communication network, and the detecting implements:

comparing at least one identifier of a sender device of said message received by said communication device with at least one identifier of a router defined by default, if said at least one identifier of the sender device of said received message is not identical or correlated to said at least one identifier of the router defined by default, deciding said sender device of said received message is a malicious device.

6. The method according to claim 1, wherein said detecting implements:

obtaining, from the configuration information, at least one identifier of at least one name resolution server, comparing said at least one identifier obtained with at least one identifier of said at least one legitimate name resolution server, and if said at least one obtained identifier is not identical or correlated to said at least one identifier of said at least one legitimate name resolution server, deciding that a sender device of said configuration information is a malicious device.

7. The method according to claim 1, wherein the method comprises, prior to the detecting:

obtaining, from the configuration information, at least one identifier of at least one name resolution server, sending, through a sender device of said configuration information, at least one name resolution request intended for said at least one identified name resolution server.

8. The method according to claim 7, wherein said communication device is a default router defined for said communication network, and said detecting further implements:

if said name resolution request transits after sending thereof by said communication device, verifying an integrity of said request, deciding that said sender device of said configuration information is a malicious device if said communication device does not receive said request or if said request is not intact.

9. The method according to claim 8, wherein said verifying the integrity of the name resolution request comprises verifying whether said request transiting through said communication device has been modified compared to the original request and/or has been duplicated.

10. The method according to claim 1, wherein the method implements:

if a response to said name resolution request is received by the communication device, comparing said response, referred to as test response, with a response to the same request originating from said at least one legitimate name resolution server, referred to as legitimate response, deciding that a sender device of said configuration information is a malicious device if said communication device does not receive said test response or if said test response is not identical or correlated to said legitimate response.

11. The method according to claim 1, wherein the method implements at least one action following the detection of the presence of a malicious device, said at least one action belonging to the group consisting of:

notifying an incident, blocking said malicious device.

12. The method according to claim 11, wherein said blocking implements filtering messages intended for or received by said malicious device.

13. The method according to claim 11, wherein the at least one action comprises notifying an incident, which belongs to the group consisting of:

a direct notification of a user of said communication device, a notification of a user of said communication device through an operator of said network, a URL redirection to ask for an explicit authorization of a user of said communication device.

14. The method according to claim 1, wherein at least one of the generating at least one second identifier for said communication device, the obtaining configuration information from a name resolution service, or the detecting the presence of a malicious device, is implemented when a new device connects to said network.

15. The method according to claim 1, wherein said at least one second identifier belongs to the group consisting of:

a MAC address, a link-local IP address, a unicast IP address, a unique local address, an application identifier.

16. The method according to claim 1, wherein detecting presence of a malicious device in the event of an anomaly comprises comparing an identifier of a sender device responding to said name resolution request sent by the emulated terminal, with said at least first identifier.

17. A communication device configured with at least one so-called legitimate name resolution server associated with at least one network interface, wherein the communication device comprises:

the at least one network interface;

at least one processor; and at least one non-transitory computer readable medium comprising instructions stored thereon which when executed by the at least one processor configure the communication device to:

communicate through the at least one network interface using at least one first identifier for said communication device, generate by the communication device at least one second identifier for said communication device and said at least one network interface, distinct from said at least one first identifier, emulate a terminal of the communication network distinct from the communication device, and communicating through said at least one network interface using said at least second identifier instead of said at least one first identifier, said emulating comprising obtaining configuration information from a name resolution service for the emulated terminal using said at least one second identifier instead of said at least one first identifier, and said at least one network interface, and detect presence of a malicious device in the event of an anomaly in processing of a name resolution request sent by the emulated terminal of said communication device using said at least one second identifier instead of said at least one first identifier and the obtained configuration information.

18. A non-transitory computer readable medium comprising instructions stored thereon which when executed by at least one processor of a communication device configure the communication device to implement a method for detecting a malicious device in a communication network, the communication device being configured with at least one legitimate name resolution server associated with at least one network interface, and the method comprising:

communicating through the at least one network interface using at least one first identifier for said communication device, generating by the communication device at least one second identifier for said communication device and said at least one network interface, distinct from said at least one first identifier, emulating a terminal of the communication network distinct from the communication device, and communicating through said at least one network interface using said at least second identifier, instead of said at least one first identifier, said emulating comprising obtaining configuration information from a name resolution service for the emulated terminal, using said at least one second identifier instead of said at least one first identifier, and said at least one network interface, and detecting presence of a malicious device in the event of an anomaly in processing of a name resolution request sent by the emulated terminal of said communication device using said at least one second identifier instead of said at least one first identifier, and the obtained configuration information.

19. A method comprising:

detecting a malicious device in a communication network, the detecting being implemented in a communication device configured with at least one legitimate name resolution server associated with at least one network, wherein the detecting comprises:

communicating through the at least one network interface using at least one first identifier for said communication device, generating by the communication device at least one second identifier for said communication device and said at least one network interface, distinct from said at least one first identifier, emulating a terminal of the communication network distinct from the communication device, and communicating through said at least one network interface using said at least one second identifier instead of said at least one first identifier, said emulating comprising obtaining configuration information from a name resolution service for the emulated terminal using said at least one second identifier, instead of said at least one first identifier, and said at least one network interface, and detecting presence of a malicious device in the event of an anomaly in processing of a name resolution request sent by the emulated terminal of said communication device using said at least one second identifier, instead of said at least one first identifier, and the obtained configuration information, wherein said detecting presence of a malicious device comprises detecting in a message received by said communication device usurpation of an identity of a default router defined for said at least one network interface by:

when said communication device is the default router for said communication network, comparing at least one identifier of a sender device of said message received by said communication device with said at least one first identifier of said communication device, and if said at least one identifier of the sender device of said received message is identical or correlated to said at least one first identifier of said communication device, deciding said sender device of said received message is a malicious device, and when said communication device is not the default router defined for said communication network comparing at least one identifier of a sender device of said message received by said communication device with at least one identifier of a router defined by default, and if said at least one identifier of the sender device of said received message is not identical or correlated to said at least one identifier of the router defined by default, deciding said sender device of said received message is a malicious device.

* * * * *